US012630217B2

(12) United States Patent
de Paula Eduardo et al.

(10) Patent No.: US 12,630,217 B2
(45) Date of Patent: May 19, 2026

(54) DRIVER FEEDBACK FOR STEER-BY-WIRE SYSTEM

(71) Applicant: GM GLOBAL TECHNOLOGY OPERATIONS LLC, Detroit, MI (US)

(72) Inventors: Gabriel de Paula Eduardo, Brighton, MI (US); Stephen A. Padilla, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 337 days.

(21) Appl. No.: 18/581,451

(22) Filed: Mar. 8, 2024

(65) Prior Publication Data

US 2025/0282418 A1    Sep. 11, 2025

(51) Int. Cl.
*B62D 6/00* (2006.01)
*B62D 5/00* (2006.01)

(52) U.S. Cl.
CPC ............. *B62D 6/008* (2013.01); *B62D 5/006* (2013.01)

(58) Field of Classification Search
CPC ......... B62D 6/008; B62D 5/006; B62D 6/006
See application file for complete search history.

(56) References Cited

U.S. PATENT DOCUMENTS

| | | | |
|---|---|---|---|
| 10,661,829 B2 | 5/2020 | Badiru | |
| 11,084,526 B2 | 8/2021 | Yu | |
| 2013/0253768 A1 | 9/2013 | Harder | |
| 2020/0298909 A1* | 9/2020 | Kogure | B62D 5/046 |
| 2022/0135128 A1 | 5/2022 | Dan | |
| 2024/0262417 A1* | 8/2024 | Tang | B62D 6/008 |

FOREIGN PATENT DOCUMENTS

| | | | | |
|---|---|---|---|---|
| CN | 119568262 A * | 3/2025 | | B62D 6/008 |
| DE | 102020104265 A1 | 8/2020 | | |
| DE | 102021205253 A1 | 11/2022 | | |
| DE | 112022001818 T5 | 2/2024 | | |
| DE | 102024113309 B3 * | 8/2025 | | B62D 15/02 |
| EP | 2902300 A1 * | 8/2015 | | B62D 6/008 |
| EP | 3406506 A1 * | 11/2018 | | B62D 5/0421 |
| EP | 4108544 A1 | 12/2022 | | |
| KR | 102314349 B1 * | 10/2021 | | B62D 5/0463 |
| WO | WO-2014054476 A1 * | 4/2014 | | B62D 15/025 |
| WO | WO-2014054626 A1 * | 4/2014 | | B62D 6/008 |

* cited by examiner

*Primary Examiner* — Drew J Brown
(74) *Attorney, Agent, or Firm* — Quinn IP Law

(57) ABSTRACT
A steer-by-wire system configured for providing driver feedback to enable a driver of a vehicle to feel when the vehicle may be operating near or at its limit of adhesion. The driver feedback may be determined based on a corrected responsive rack force derived as a function of an observed responsive rack force, a reference responsive rack force, a target responsive rack force, and/or a minimum saturation value.

20 Claims, 4 Drawing Sheets

DRIVER FEEDBACK FOR STEER-BY-WIRE SYSTEM

INTRODUCTION

The present disclosure relates to providing driver feedback for a vehicle having a steer-by-wire system, such as to enable a driver to feel when the vehicle may be operating near or at its limit of adhesion.

A limit of adhesion may correspond with a maximum amount of traction or grip that a suspension and steering system may provide before a vehicle begins losing traction and/or starts to slip. The limit of adhesion may vary widely depending on different suspension and steering kinematics of a particular vehicle and whether the vehicle includes wheels or other features for directing movement. In the case of a wheeled vehicle, for example, it may be beneficial to provide driver feedback so that a driver may feel when the wheels may be operating near or at their limit of adhesion, which the driver may then consider when deciding how to continue operating the vehicle. Some vehicles may be equipped with a steer-by-wire system whereby steerage may be provided via actuators, motors, and/or other components operating without a direct physical linkage between the driver and the wheels. The lack of a force transferring mechanical connection between the driver and the wheels in a steer-by-wire vehicle may limit an ability of the driver to feel when the vehicle may be operating near or at its limit of adhesion.

SUMMARY

One aspect of the present disclosure relates to providing driver feedback. The driver feedback may be operable for assisting a driver in feeling when a vehicle, or more particularly when one or more wheels of the vehicle, may be operating near or at a limit of adhesion. The driver feedback may be provided via actuators or other electro-mechanical devices of a steer-by-wire system so as to provide the driver feedback without having to rely upon a physical linkage to directly transfer mechanical force from the wheels to the driver.

One aspect of the present disclosure relates to a method of providing driver feedback for a vehicle having a steer-by-wire system. The method may include determining an observed responsive rack force based on a responsive rack force measurement taken with a responsive rack force observer of the steer-by-wire system, optionally with the observed responsive rack force representing a force imparted by one or more wheels of the vehicle against a steering force provided to the wheels with the steer-by-wire system, estimating a reference responsive rack force based on a reference model of the steer-by-wire system, optionally with the reference model characterizing current suspension and steering kinematics for the steer-by-wire system and the reference responsive rack force representing a referenced force modeled with the reference model for the wheels against the steering force, estimating a target responsive rack force based on a target model of the steer-by-wire system, optionally with the target model characterizing targeted suspension and steering kinematics for the steer-by-wire system and the target responsive rack force representing a targeted force modeled with the target model for the wheels against the steering force, determining a corrected responsive rack force as a function of the observed responsive rack force, the reference responsive rack force, and the target responsive rack force, and determining a driver feedback torque based on the corrected responsive rack force.

The method may include determining the corrected responsive rack force according to a rack equation, optionally with the rack equation being defined as:

$$CRF=\max((RRF-TRF)+ORF),MSV)$$

wherein CRF equals the corrected responsive rack force, RRF equals the reference responsive rack force, TRF equals the target responsive rack force, ORF equals the observed responsive rack force, and MSV equals a minimum saturation value for the steer-by-wire system.

The method may include providing the driver feedback torque to a steering wheel actuator, the steering wheel actuator configured to impart a responsive steering force to a steering wheel of the steer-by-wire system in proportion to the driver feedback torque.

The method may include determining a plurality of steer-by-wire variables used to represent operating influences on the steer-by-wire system, estimating the reference responsive rack force based on processing the steer-by-wire variables with the reference model, and estimating the reference responsive rack force based on processing the steer-by-wire variables with the reference model.

The method may include the reference model estimating the reference responsive rack force based on a reference curve defined relative to one or more of the steer-by-wire variables and the target model estimating the target responsive rack force based on a target curve defined relative to one or more of the steer-by-wire variables.

The method may include defining a normal handling range, a non-linear handling range, a near limit handling range, and a limit of adhesion for the steer-by-wire system relative to one or more of the steer-by-wire variables.

The method may include the target curve having a smoother gradient than the reference curve within the near limit handling range.

The method may include the target curve having a slope that decreases at a constant rate within the near limit handling range.

The method may include the target curve having a similar gradient as the reference curve within the normal handling range.

The method may include the reference curve and the target curve being defined relative to lateral acceleration of the vehicle and/or a steering wheel angle of the steering wheel, the lateral acceleration and/or the steering wheel angle being included as part of the steer-by-wire variables.

The method may include determining the minimum saturation value as function of a vehicle speed determined for the vehicle, the vehicle speed being included as part of the steer-by-wire variables.

One aspect of the present disclosure relates to a system for providing driver feedback within a vehicle having a steer-by-wire system. The system may include an observer configured for measuring an observed responsive rack force of the steer-by-wire system, optionally with the observed responsive rack force representing a responsive force imparted by one or more wheels of the vehicle against a steering force provided to the wheels with the steer-by-wire system. The system may include a monitoring system configured for determining a plurality of steer-by-wire variables to represent operating influences on the steer-by-wire system. The system may include a reference model defined relative to current suspension and steering kinematics for the steer-by-wire system, optionally with the reference model configured for estimating a reference responsive rack force of the steer-by-wire system based on modeling one or more of the steer-by-wire variables. The system may include a target model defined relative to target suspension and steering kinematics for the steer-by-wire system, optionally with the target model configured for estimating a target responsive rack force of the steer-by-wire system based on modeling one or more of the steer-by-wire variables. The system may include a responsive rack force controller configured for determining a corrected responsive rack force as a function of the observed responsive rack force, the reference responsive rack force, and the target responsive rack force. The system may include a steering wheel controller configured for determining a driver feedback torque based on the corrected responsive rack force.

The system may include an operating mode controller configured for determining when the steer-by-wire system is operating within a non-near limit handling range and a near limit handling range, optionally with the near limit handling range being a first predefined operating range occurring prior to reaching a limit of adhesion of the wheels and the non-near limit handling range being a second predefined operating range occurring prior to reaching the near limit handling range.

The system may include the responsive rack force controller configured for determining the corrected responsive rack force according to a near limit rack equation when the steer-by-wire system is operating within the near limit handling range, optionally with the near limit rack equation being defined as:

$$CRF=(RRF-TRF)+ORF$$

wherein CRF equals the corrected responsive rack force, RRF equals the reference responsive rack force, TRF equals the target responsive rack force, and ORF equals the observed responsive rack force.

The system may include the responsive rack force controller configured for increasing the corrected responsive rack force to a minimum saturation value when the corrected responsive rack force is less than an adhesion threshold defined relative to the limit of adhesion.

The system may include a steering wheel actuator configured for imparting a responsive steering force to a steering wheel of the steer-by-wire system in proportion to the driver feedback torque.

The system may include the reference is configured for estimating the reference responsive rack force based on a reference curve defined relative to one or more of the steer-by-wire variables and the target model configured for estimating the target responsive rack force based on a target curve defined relative to one or more of the steer-by-wire variables, optionally with the target curve differing in shape from the reference curve within the near limit handling range.

The system may include the target curve configured with a smoother gradient than the reference curve within the near limit handling range and with a similar gradient to the reference curve within the non-near limit handling range.

One aspect of the present disclosure relates to vehicle having a plurality of wheels operable to facilitate movement of the vehicle, a powertrain operable to rotate one or more of the wheels in response to mechanical power generated with an internal combustion engine and/or an electric motor, and a steer-by-wire system configured for steering one or more of the wheels. The steer-by-wire system may be configured for determining an observed responsive rack force based on a responsive rack force measurement taken with a responsive rack force observer of the steer-by-wire system, estimating a reference responsive rack force based on a reference model of the steer-by-wire system, estimating a target responsive rack force based on a target model of the steer-by-wire system, determining a corrected responsive rack force according to a rack equation, and determining a driver feedback torque based on the corrected responsive rack force. The corrective responsive rack force may be based on a rack equation being defined as:

$$CRF=max((RRF-TRF)+ORF),MSV)$$

wherein CRF equals the corrected responsive rack force, RRF equals the reference responsive rack force, TRF equals the target responsive rack force, ORF equals the observed responsive rack force, and MSV equals a minimum saturation value for the steer-by-wire system.

The vehicle a may include the reference model configured for estimating the reference responsive rack force based on a reference curve defined relative to current suspension and steering kinematics for the steer-by-wire system and one or more steer-by-wire operating variables and the target model configured for estimating the target responsive rack force based on a target curve defined relative to targeted suspension and steering kinematics for the steer-by-wire system and one or more of the steer-by-wire operating variables, optionally with the target curve having a smoother gradient than the reference curve within a near limit handling range of the steer by wire system and the near limit handling range corresponding with a predefined operating range occurring prior to reaching a limit of adhesion of the wheels.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
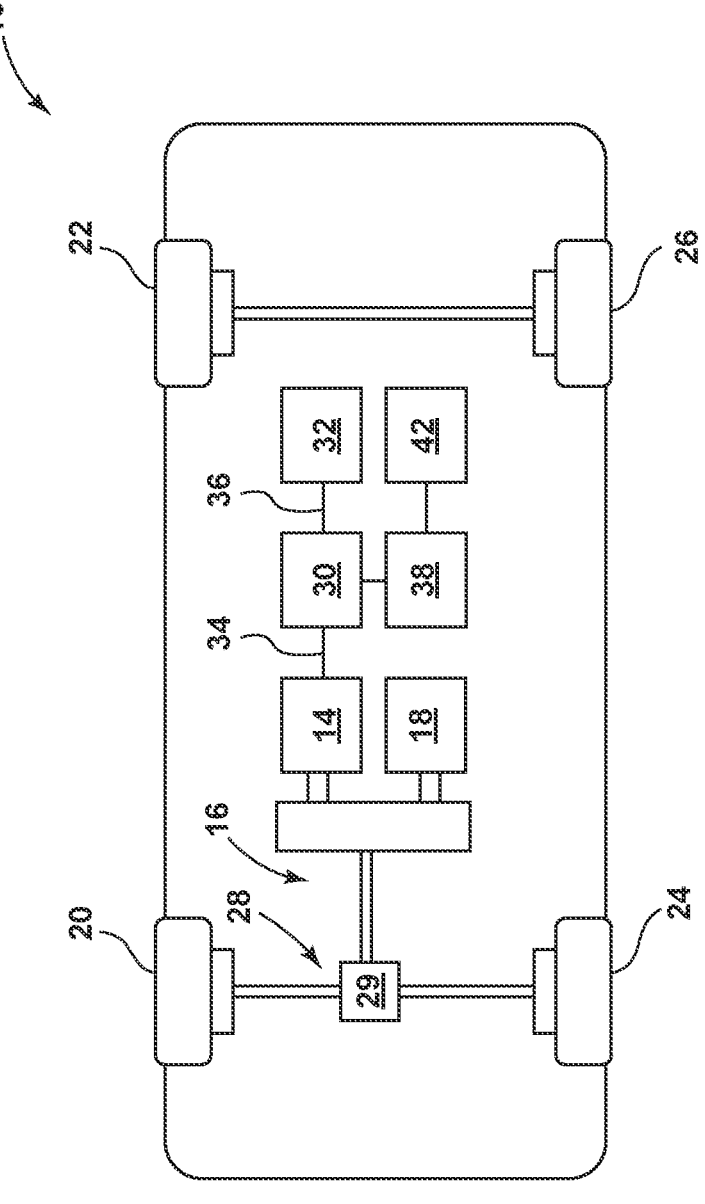
FIG. 1 illustrates a feedback system for providing driver feedback in accordance with one aspect of the present disclosure.

FIG. 1 illustrates a feedback system 10 for providing driver feedback in accordance with one aspect of the present disclosure. The feedback system 10 may be configured for providing driver feedback to a driver of a vehicle 12 or other occupant, such as to assist a driver in feeling when the vehicle 12 may be operating near or at a limit of adhesion. The vehicle 12 is shown as an automobile for exemplary purposes as the present disclosure fully contemplates the feedback system 10 being similarly beneficial with other types of vehicles, equipment, etc. The vehicle 12 may include an electric, traction motor 14 operable for converting electrical power to mechanical power for purposes of performing work, such as for mechanically powering a drivetrain 16 to propel the vehicle 12. The vehicle 12 is illustrated as a hybrid type due to the powertrain 16 optionally including an internal combustion engine (ICE) 18 for generating mechanical power. The vehicle 12 may alternatively omit the electric motor 14 and/or the ICE 18. The powertrain 16 may include componentry to facilitate conveying mechanical, rotative force from the traction motor 14 and/or the ICE 18 to one or more of the wheels 20, 22, 24, 26. The vehicle 12 may include a steering and suspension system 28 having a steer-by-wire system 29 for providing steerage, which is shown for exemplary purposes to correspond with steering the front wheels 20, 24. The present disclosure, however, fully contemplates the steer-by-wire system 29 being operable for alternatively steering the rear wheels 22, 26 and/or providing four-wheel or all-wheel steering. The vehicle 12 may include a rechargeable energy storage system (RESS) 30 to store and supply electrical power for the traction motor 14 and/or other components, systems, etc. 32 onboard the vehicle 12, such as via a first bus 34 (e.g., main or HV bus) and a second bus 36 (e.g., auxiliary or LV bus).

The vehicle 12 may include a vehicle controller 38 to facilitate monitoring, controlling, measuring, and otherwise directing operation, performance, etc. onboard the vehicle 12, which may include performing measurements, taking readings, or otherwise collecting data to facilitate operations. The vehicle controller 38 may include additional controllers, with the operations associated therewith optionally being undertaken according to one or more processors executing corresponding non-transitory instructions stored on one or more computer-readable storage mediums. The controller 38 may be configured to interact with other systems, controllers, and features included onboard and/or offboard the vehicle 12 to facilitate the operations, processes, and other activities associated with providing feedback driver feedback in a manner described herein. While predominantly described with respect to providing driver feedback the driver, the present disclosure fully contemplates the feedback system 10 and/or a related feedback controller 42 being operable with an advanced driver assistance system (ADAS), an autonomous driving system, or other system associated with the vehicle 12. The driver feedback may be operable with such systems to facilitate related action without necessarily requiring corresponding communication to and/or interaction of the related feedback with the driver.

Figure 2:
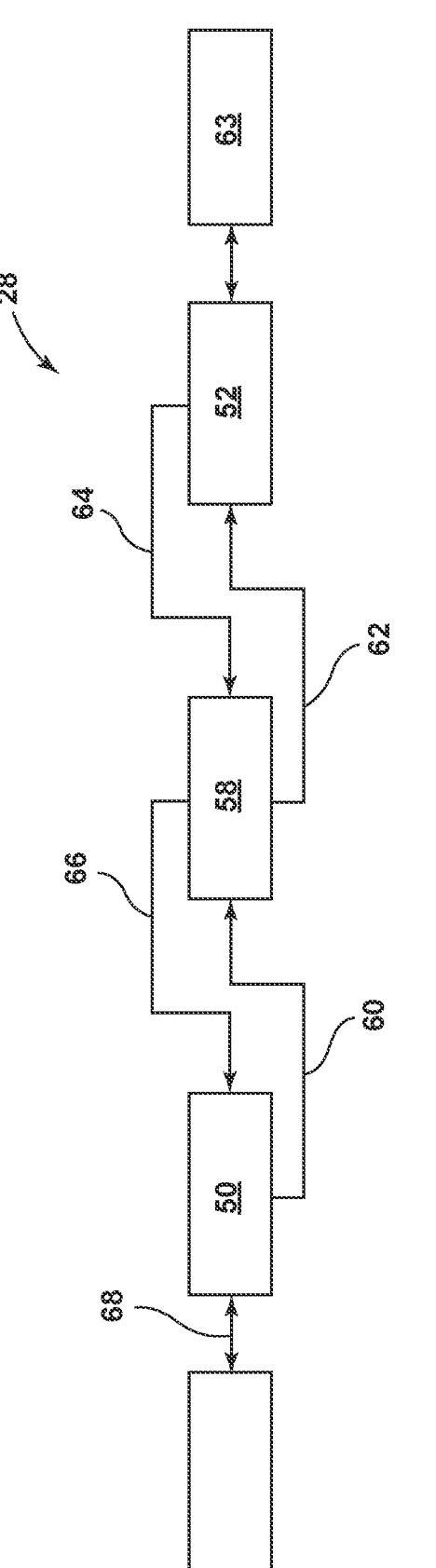
FIG. 2 illustrates a schematic diagram of a steer-by-wire system providing driver feedback in accordance with one aspect of the present disclosure.

FIG. 2 illustrates a schematic diagram of the suspension system 28 providing driver feedback in accordance with one aspect of the present disclosure. The suspension system 28, or more specifically steer-by-wire system 29 therein, may be shown to include a steering actuator 50 and a wheel actuator 52 cooperating with a steer-by-wire controller 58 to facilitate steering the vehicle 12. The steering wheel actuator 52 be configured for electro-mechanically actuating, turning, or otherwise interfacing with a handwheel or other steering implement accessible to the driver. The wheel actuator 52 may be configured for electro-mechanically actuating, turning otherwise interfacing with a suspension system 28 associated with turning one or more of the wheels 20, 24. The operation of the steer-by-wire system 29 may include: the steering actuator 50 generating a steering signal 60 to reflect a driver imparting a steering force to the handwheel for purposes of steering the vehicle 12; the steer-by-wire controller 58 responsibly generating a wheel signal 62 for directing the wheel actuator 52 to correspondingly steer the wheels 20, 24 via components 63 of the suspension system 28; the wheel actuator 52 providing a rack force signal 64 to the steer-by-wire controller 58 to indicate a responsive rack force experienced at the suspension system 28 as a result of vehicle 12 movement tending to counteract or turn the wheels 20, 24 back towards center or against the turning of the wheel actuator 52; the steer-by-wire controller 58 responsively providing a driver feedback signal 66 to the steering actuator 50 based on the responsive rack force; and the steering actuator 50 converting the driver feedback signal 66 to a driver torque or other force 68 sufficient for correspondingly actuating the handwheel to provide a driver feedback. The driver feedback may correspond with a resistive or responsive force generated with the steering actuator 50 against the steering force imparted to the handwheel by the driver, i.e., the driver feedback 68 may be used to provide a slight counteracting force to the force imparted by the driver so that the driver may feel or otherwise haptically sense the responsive rack force.

The ability to provide the driver feedback 68 via a tactile control of the handwheel may be helpful in allowing the driver to sense operation of the wheels 20, 24 without having to rely upon a direct physical linkage between the driver and the wheels 20, 24. The driver feedback 68 contemplated herein, in other words, may be used to make up for the lack of a force transferring mechanical connection between the driver and the wheels 20, 24 so as to enable the driver to physically assess the wheels 20, 24 when not physically connected thereto. The capability of the present disclosure to enable the driver feedback 68 may be helpful, for example, in allowing the driver to assess whether the vehicle 12, or more particularly the steered wheels 20, 24, may be approaching a limit of adhesion. The limit of adhesion may correspond with a maximum amount of traction or grip that the suspension system 28 may provide before the wheels 20, 24 begin losing traction and/or start to slip. The limit of adhesion may vary widely depending on different suspension and steering kinematics of a particular vehicle 12, how fast the vehicle 12 is being driven, a tread or type of tire, the road surface, etc.; however, regardless of these variable and/or the capabilities of the suspension system 28, the driver feedback 68 may be advantageous in allowing the driver to consider whether the vehicle 12 is approaching the limit of adhesion and how to correspondingly operate the vehicle 12.

Figure 3:
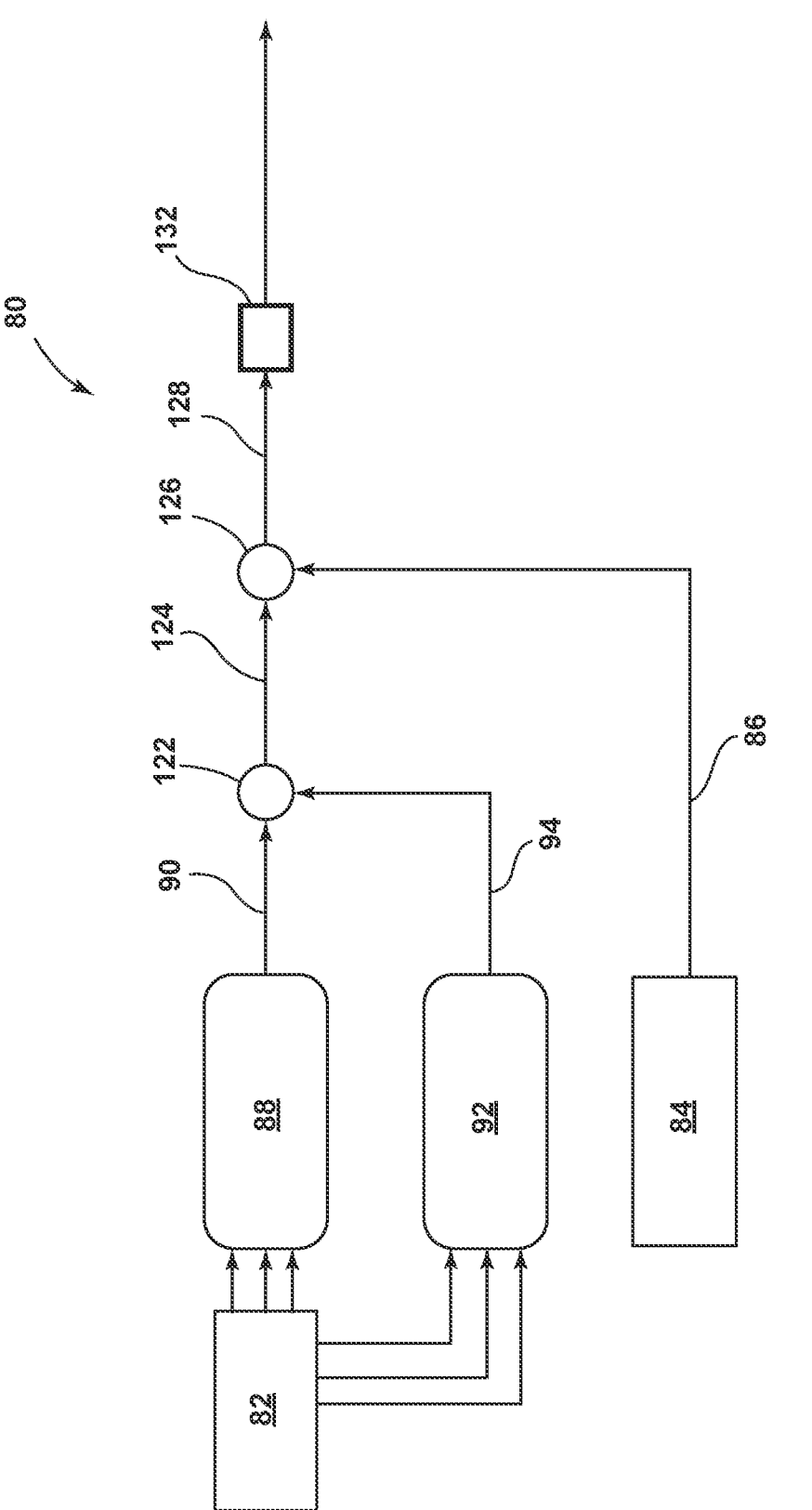
FIG. 3 illustrates a flowchart for a method of providing driver feedback in accordance with one aspect of the present disclosure.

FIG. 3 illustrates a flowchart 80 for a method of providing driver feedback 68 in accordance with one aspect of the present disclosure. The method is described with respect to the steer-by-wire system 29 whereby steering of the wheels 20, 24 may be performed according to signals carried over wires or other communication mediums incapable themselves of physically linking or transferring force. While described with respect to a four wheeled vehicle 12 having front wheel steering, the present disclosure fully contemplates the method being advantageous in facilitating driver feedback 68 for other types of vehicles, including autonomous vehicles, that may employ a similar type of steering system. The method may be embodied and/or assisted with operation of the steer-by-wire controller 58 and/or other controllers or systems onboard and/or offboard the vehicle 12, which may in turn operate according to one or more processors executing a corresponding plurality of non-transitory instructions stored on one or more related computer-readable storage mediums. The method is described with respect to using responsive rack force due to responsive rack force being understood to one having ordinary skill as a suitable indicator of forces acting on the wheels 20, 24 against steerage provided thereto. This is done for non-limiting purposes of the present disclosure fully contemplates the method being similarly beneficial when implemented according to other constraints besides responsive rack force.

Block 82 relates to a monitoring system included as part of the steer-by-wire controller 58 or as a standalone system determining a plurality of steer-by-wire variables. The steer-by-wire variables may be used to represent operating influences on the steer-by-wire system 29 and/or the vehicle 12, such as but not necessarily limited to a steering wheel angle of the handwheel, a vehicle speed of the vehicle 12, a road friction of a road surface the vehicle 12 may riding upon, a lateral acceleration of the vehicle 12, and/or other variables or factors capable of being measured, sensed, calculated, estimated, etc. as the vehicle 12 travels. Block 84 relates to an observer included as part of the steer-by-wire controller 58 or as a standalone system measuring an observed responsive rack force 86 of the steer-by-wire system 29. The observed responsive rack force 86 may be measured with a sensor attached to a tie rod or another component of the suspension system 28 connected to the wheels 20, 24 such that the measured values may quantify a responsive force applied to the suspension system 28 as result of the wheel acting in response to movement of the vehicle 12 against the steering thereof until the limit of adhesion is surpassed. The observed responsive rack force 86 may be representative of an actual or real-world forces or power imparted by one or more wheels 20, 24 against the turning force provided to turn the wheels 20, 24 via the wheel actuator 52, i.e., a counter response provided by the wheels 20, 24 against the wheel actuator 52.

Block 88 relates to the steer-by-wire controller 58 being programmed with or otherwise generating a reference model for current suspension and steering kinematics of the suspension system 28. The reference model may be a bicycle model or other suitable model defined relative to components, operational capabilities, and/or other aspects of the suspension system 28 actually or currently included onboard the vehicle 12 to model its performance. The reference model may be configured to estimate a reference responsive rack force 90 for the steer-by-wire system 29 based on modeling one or more of the steer-by-wire variables. The reference responsive rack force 90 may represent a referenced force modeled for the wheels 20, 24 to reflect force generated by the wheels 20, 24 against the turning force imparted by the driver to the handwheel and/or the force imparted by the wheel actuator 52 to turn the wheels 20, 24. The reference responsive rack force 90 may be equivalent to the observed responsive rack force 86, with one difference being the reference responsive rack force 90 being estimated using the reference model and the observed responsive rack force 86 being an actual force measured with a sensor included onboard vehicle 12. The reference model may be constructed as a theoretical framework or mathematical model based on assumptions, principles, and data for the suspension system 28 such that the reference model may be used for predicting how the suspension system 28 may respond under various scenarios capable of being input to the model reference model as a function of one or more of the steer-by-wire variables.

Block 92 relates to the steer-by-wire controller 58 being programmed with or otherwise generating a target model relative to target or desired suspension and steering kinematics. The target model may be defined relative to components, operational capabilities, and/or other aspects of a desired or targeted steering and/or suspension system 28 not actually or presently included onboard the vehicle 12. In contrast to the reference model, the target model may be used to model an ideal or desired steering and suspension system 28 differing from that actually included onboard the vehicle 12. The target model may be generated according to desired performance characteristics and used as a comparison tool to the reference model. Like the reference model, however, the target model may be similarly configured to estimate a target responsive rack force 94 for the steer-by-wire system 29 based on modeling one or more of the steer-by-wire variables. The target responsive rack force 94 may represent a targeted force modeled for the wheels 20, 24 to reflect force generated by the wheels 20, 24 against the steering force imparted by the driver to the handwheel and/or the force imparted by the wheel actuator 52 to the wheels 20, 24. The target responsive rack force 94 may be equivalent to the observed responsive rack force 86, with one difference being the target responsive rack force 94 being estimated using the target model and the observed responsive rack force 86 being an actual force measured with a wheel sensor included onboard vehicle 12. The target model may be constructed as a theoretical framework or mathematical model based on assumptions, principles, and data for an idealized or desired steering and suspension system 28 such that the target model may be used for predicting how an ideal or desired steering and suspension system 28 may respond to various scenarios. The target model may differ from the reference model due to it modeling a hypothetical response of another configuration of a suspension system 28 not presently on vehicle 12, which may differ from the suspension system 28 included onboard the vehicle 12. This type of comparison modeling may be beneficial in assessing actual or current performance estimated with the reference model relative to a target performance estimated with the target model.

Figure 4:
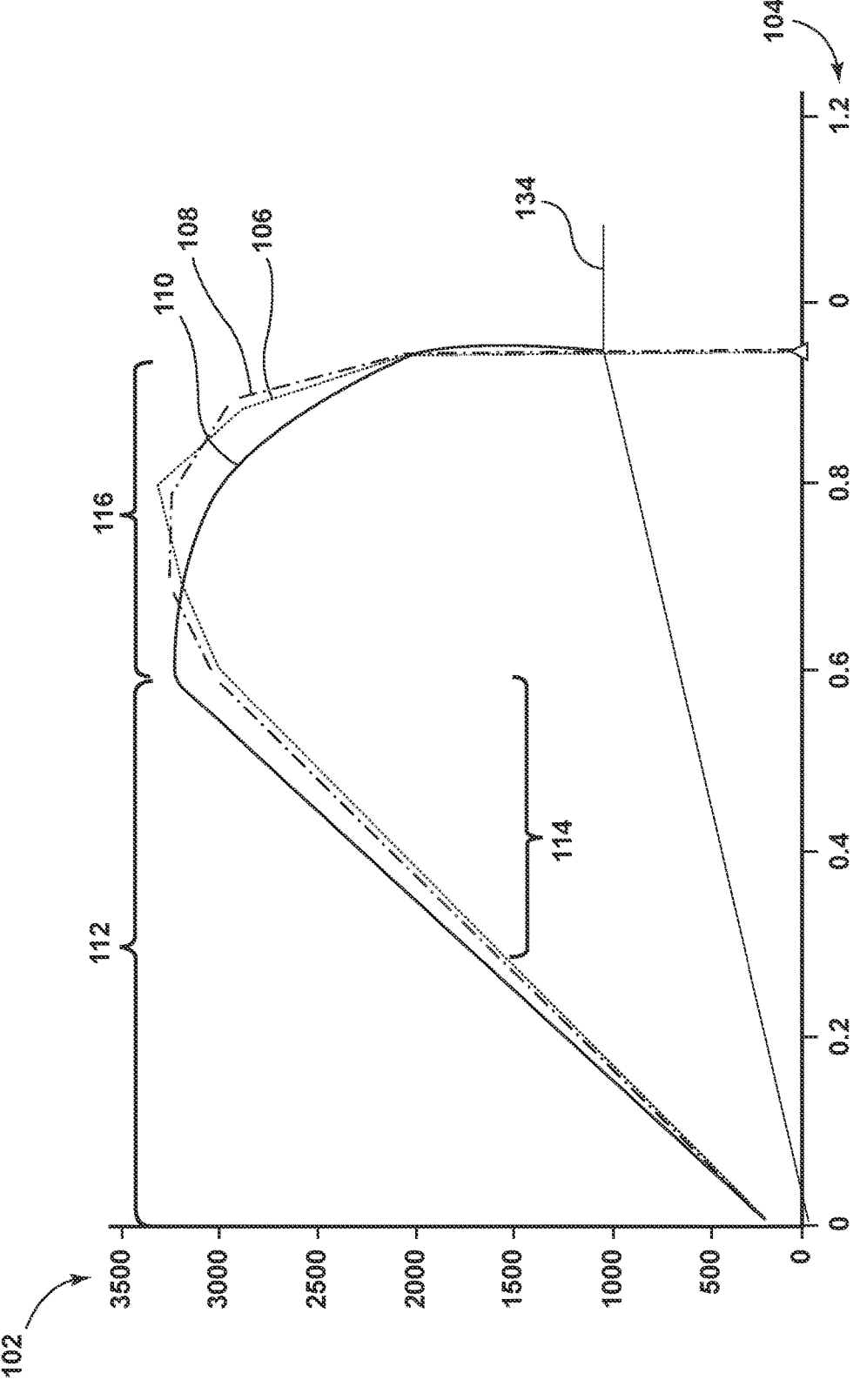
FIG. 4 illustrates a graph of responsive rack forces in accordance with one aspect of the present disclosure.

FIG. 4 illustrates a graph 100 of responsive rack forces in accordance with one aspect of the present disclosure. The graph 100 may include a vertical axis 102 representing force, such as according to Newton (N), and a horizontal axis 104 representing one or more of the steer-by-wire variables, such as lateral acceleration, which may be represented according to gravitational units (g). The graph 100 may include an observed curve 106 to reflect the observed responsive rack force 86 measured with the observer. The observed curve 106 may correspond with the observer actually measuring the responsive rack force as the vehicle 12 is being driven, optionally with the observer recording the steer-by-wire variables coinciding therewith. The graph may additionally include a reference curve 108 and a target curve 110 to respectively illustrate and compare the referenced responsive rack force and the target responsive rack force 94 generated with the respective reference and target models relative to the observed curve 106. The reference and target curves 108, 110 may result from the respective reference and target models processing the steer-by-wire variables recorded when generating the observed curve 106. The observed curve 106 may be expected to be closely aligned with the reference curve 108, assuming the reference model is an accurate representation of the suspension system 28. The target curve 110 is shown to be slightly different from the observed and reference curves 106, 108 due to the target model generating a targeted or desired responsive rack force that may be desired for the vehicle 12 even though the suspension system 28 currently on the vehicle 12 may be incapable of independently achieving the same result.

The graph 100 may be defined or divided according to a normal handling range 112, which may include a non-linear handling range 114, a near limit handling range 116, and a limit of adhesion 118. The limit of adhesion 118 may vary from vehicle to vehicle and is shown for exemplary purposes to correspond with approximately 0.95 g. The limit of adhesion 118 may correspond with the point at which the wheels 20, 24 lose traction or begin to slip, which as illustrated may correspond with the observed responsive rack force 86 dropping to zero due to the attendant wheel slippage preventing or effectively limiting the wheels 20, 24 from providing or generating force against the wheel actuator 52. The near limit handling range 116 may correspond with a predefined or a selectable operating range occurring prior to reaching the limit of adhesion, which is shown to start at a point at which the responsive rack force may begin to diminish due to the wheels 20, 24 initially starting to lose traction or partially slip. The non-linear handling range 114 may correspond with a predefined or a selectable operating range occurring prior to the near limit operating range within the normal handling range 112. The ranges 112, 114, 116, 118 are presented for non-limiting purposes to highlight different handling ranges that may be useful in demarcating events associated with conditions during which wheel slippage may be unlikely, i.e., during the normal and/or non-linear operating handling ranges, where wheel slippage may occur while at least some real responsive rack force is being provided, i.e., during the near limit handling range, and where wheel slippage may result in the steering and suspension system 28 generating zero actual responsive rack force.

The target curve 110 may be created in the illustrated manner according to a corresponding configuration of the target model such that the target curve 110 differs from the observed and the reference curves 106, 108, particularly as the vehicle 12 approaches the near limit handling range 116. This differentiation may be reflective of how the vehicle 12 would experience a responsive rack force if the suspension system 28 were capable of inducing the corresponding responsive rack force. The target curve 110, such as after achieving peak responsive rack force at the beginning of the near limit range 116, may begin to decaying at a slope per lateral acceleration that matches and may be in the range of 5% to 50% of the reference curve 108, at a lower lateral acceleration such as 5% to 20% less than the reference curve 108, or in another manner, e.g., the target curve 110 may have smoother gradient than the reference curve 108 within the near limit handling range 116, a delta or rate of change matching or tracking the reference curve 108 but by lesser amount, and/or at a steady or fixed rate. The capability to tune the target curve 110, or more specifically the target model, relative to desired responsive rack force performance may be beneficial in comparing performance of the actual suspension system 28 to a desired standard, particularly with respect to identifying how the desirable suspension system 28 may operate within the near limit handling range. One aspect of the present disclosure contemplates configuring the target model to represent the feel or other sensations desired for feedback to the driver, which may be based on comparing the observed and reference responsive rack forces 86, 90 to the target responsive rack force 94 such that differences therebetween may form a basis for the driver feedback 68.

Returning to FIG. 3, Block 122 relates to an offset process whereby the steer-by-wire controller 58 may determine an offset or difference 124 between the reference responsive rack force 90 in the target responsive rack force 94. The responsive rack force offset 124 may be determined by subtracting the target responsive rack force 94 from the reference responsive rack force 90 or otherwise determining a difference therebetween. The responsive rack force offset 124 may be used to quantify a deviation of the suspension system 28 relative to the hypothetical suspension system 28 used for the target model, which may coincide with a value representing a separation between the target curve 110 and the reference curve 108 for a given set of the steer-by-wire variables occurring at the time of modeling. Block 126 relates to a correction process for determining a corrected responsive rack force 128. The corrected responsive rack force 128 may be determined by adding the responsive rack force offset 124 to the observed responsive rack force 86, which may correspond with the corrected responsive rack force 128 being greater or less than the observed responsive rack force 86 depending on the responsive rack force offset 124. The generation of the corrected responsive rack force 128 based on the responsive rack force offset 124 may be derived in this manner from differences between the reference model and the target model. Estimating the responsive rack force offset 124 independently of the observed responsive rack force 86 may enable the present disclosure to determine the corrected responsive rack force 128 without having to base the calculation thereof on the observed responsive rack force 86. In other words, the reference and target models may operate as a function of the steer-by-wire variables instead of requiring input of the observed responsive rack force 86, which in turn may permit the responsive rack force offset 124 to be calculated more efficiently and/or without having to account for relatively rapid and almost constant changes in the observed responsive rack force 86 that tends to occur while driving.

Block 132 relates to a saturation process whereby the steer-by-wire controller 58 may determine a minimum saturation value. The minimum saturation value may be used for setting a minimum value for the corrected responsive rack force 128. The minimum saturation value may be used for increasing the corrected responsive rack force in the event the corrected responsive rack force 128 is below a minimum threshold. The steer-by-wire controller 58 may include a saturation model for determining the minimum saturation value, which may be based on one or more of the steer-by-wire variables. One aspect of the present disclosure contemplates the saturation model being based on vehicle speed, lateral acceleration, and/or road friction such that the minimum saturation value may be increased in size or decrease depending on vehicle 12 operation, e.g., the saturation value may be less when the vehicle 12 was traveling slower and greater when the vehicle 12 is traveling faster. FIG. 4 illustrates a saturation curve 134 that may be representative of the minimum saturation value. Accordingly, when the minimum saturation value is included, the corrected responsive rack force may be determined according to a rack equation defined as:

$$CRF=max((RRF-TRF)+ORF),MSV)$$

wherein CRF equals the corrected responsive rack force, RRF equals the reference responsive rack force 90, TRF equals the target responsive rack force 94, ORF equals the observed responsive rack force 86, and MSV equals a minimum saturation value for the steer-by-wire system 29. Alternatively, when the minimum saturation value is optionally omitted, the corrected responsive rack force may be determined according to a near limit rack equation defined as:

$$CRF = (RRF - TRF) + ORF)$$

wherein CRF equals the corrected responsive rack force, RRF equals the reference responsive rack force 90, TRF equals the target responsive rack force 94, and ORF equals the observed responsive rack force 86.

Returning to FIG. 2, the corrected responsive rack force 128 may be provided from the steer-by-wire controller 58 to the steering actuator 50 within the signal 66. The steering actuator 50 may in turn generate a responsive torque or force 68 on the handwheel. This responsive action may be generated to provide the driver feedback 68, optionally with the driver feedback 68 more closely aligning with the target curve 110 so that the driver may be better able to feel and sense when the vehicle 12 is entering the near limit of adhesion and when the vehicle 12 is closing in the limit of adhesion. The driver feedback 68 may be provided with the illustrated smoother and/or consistent gradient so that the driver feedback 68, i.e., responsive action on the handwheel, slowly or steadily decreases as the vehicle 12 moves through the near limit range, which may be more beneficial that feedback derived from the reference and/or observed responsive rack forces 90, 94 as those force would result in feedback with more sudden changes that in turn limit the feel and timing at which the driver may sense an approach to the limit of adhesion.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method of providing driver feedback for a vehicle having a steer-by-wire system, comprising:

determining an observed responsive rack force based on a responsive rack force measurement taken with a responsive rack force observer of the steer-by-wire system, the observed responsive rack force representing a force imparted by one or more wheels of the vehicle against a steering force provided to the wheels with the steer-by-wire system;

estimating a reference responsive rack force based on a reference model of the steer-by-wire system, the reference model characterizing current suspension and steering kinematics for the steer-by-wire system, the reference responsive rack force representing a referenced force modeled with the reference model for the wheels against the steering force;

estimating a target responsive rack force based on a target model of the steer-by-wire system, the target model characterizing targeted suspension and steering kinematics for the steer-by-wire system, the target responsive rack force representing a targeted force modeled with the target model for the wheels against the steering force;

determining a corrected responsive rack force as a function of the observed responsive rack force, the reference responsive rack force, and the target responsive rack force; and determining a driver feedback torque based on the corrected responsive rack force.

2. The method according to claim 1, further comprising:

determining the corrected responsive rack force according to a rack equation, the rack equation being defined as:

$$CRF = \max((RRF - TRF) + ORF), MSV)$$

wherein CRF equals the corrected responsive rack force, RRF equals the reference responsive rack force, TRF equals the target responsive rack force, ORF equals the observed responsive rack force, and MSV equals a minimum saturation value for the steer-by-wire system.

3. The method according to claim 2, further comprising:

providing the driver feedback torque to a steering wheel actuator, the steering wheel actuator configured to impart a responsive steering force to a steering wheel of the steer-by-wire system in proportion to the driver feedback torque.

4. The method according to claim 3, further comprising:

determining a plurality of steer-by-wire variables used to represent operating influences on the steer-by-wire system;

estimating the reference responsive rack force based on processing the steer-by-wire variables with the reference model; and estimating the reference responsive rack force based on processing the steer-by-wire variables with the reference model.

5. The method according to claim 4, further comprising:

the reference model estimating the reference responsive rack force based on a reference curve defined relative to one or more of the steer-by-wire variables; and the target model estimating the target responsive rack force based on a target curve defined relative to one or more of the steer-by-wire variables.

6. The method according to claim 5, further comprising:

defining a normal handling range, a non-linear handling range, a near limit handling range, and a limit of adhesion for the steer-by-wire system relative to one or more of the steer-by-wire variables.

7. The method according to claim 6, further comprising:

the target curve having a smoother gradient than the reference curve within the near limit handling range.

8. The method according to claim 6, further comprising:

the target curve having a slope that decreases at a constant rate within the near limit handling range.

9. The method according to claim 7, further comprising:
the target curve having a similar gradient as the reference
curve within the normal handling range.

10. The method according to claim 9, further comprising:
the reference curve and the target curve being defined
relative to lateral acceleration of the vehicle and/or a
steering wheel angle of the steering wheel, the lateral
acceleration and/or the steering wheel angle being
included as part of the steer-by-wire variables.

11. The method according to claim 10, further compris-
ing:
determining the minimum saturation value as function of
a vehicle speed determined for the vehicle, the vehicle
speed being included as part of the steer-by-wire vari-
ables.

12. A system for providing driver feedback within a
vehicle having a steer-by-wire system, comprising:
an observer configured for measuring an observed respon-
sive rack force of the steer-by-wire system, the
observed responsive rack force representing a respon-
sive force imparted by one or more wheels of the
vehicle against a steering force provided to the wheels
with the steer-by-wire system;
a monitoring system configured for determining a plural-
ity of steer-by-wire variables to represent operating
influences on the steer-by-wire system;
a reference model defined relative to current suspension
and steering kinematics for the steer-by-wire system,
the reference model configured for estimating a refer-
ence responsive rack force of the steer-by-wire system
based on modeling one or more of the steer-by-wire
variables;
a target model defined relative to target suspension and
steering kinematics for the steer-by-wire system, the
target model configured for estimating a target respon-
sive rack force of the steer-by-wire system based on
modeling one or more of the steer-by-wire variables;
a responsive rack force controller configured for deter-
mining a corrected responsive rack force as a function
of the observed responsive rack force, the reference
responsive rack force, and the target responsive rack
force; and
a steering wheel controller configured for determining a
driver feedback torque based on the corrected respon-
sive rack force.

13. The system according to claim 12, further comprising:
an operating mode controller configured for determining
when the steer-by-wire system is operating within a
non-near limit handling range and a near limit handling
range, the near limit handling range being a first
predefined operating range occurring prior to reaching
a limit of adhesion of the wheels, the non-near limit
handling range being a second predefined operating
range occurring prior to reaching the near limit han-
dling range.

14. The system according to claim 13, wherein:
the responsive rack force controller is configured for
determining the corrected responsive rack force
according to a near limit rack equation when the
steer-by-wire system is operating within the near limit
handling range, the near limit rack equation being
defined as:

$$CRF=(RRF-TRF)+ORF)$$

wherein CRF equals the corrected responsive rack force,
RRF equals the reference responsive rack force, TRF equals the target responsive rack force, and ORF equals
the observed responsive rack force.

15. The system according to claim 14, wherein:
the responsive rack force controller is configured for
increasing the corrected responsive rack force to a
minimum saturation value when the corrected respon-
sive rack force is less than an adhesion threshold
defined relative to the limit of adhesion.

16. The system according to claim 15, further comprising:
a steering wheel actuator configured for imparting a
responsive steering force to a steering wheel of the
steer-by-wire system in proportion to the driver feed-
back torque.

17. The system according to claim 16, wherein:
the reference model is configured for estimating the
reference responsive rack force based on a reference
curve defined relative to one or more of the steer-by-
wire variables;
the target model is configured for estimating the target
responsive rack force based on a target curve defined
relative to one or more of the steer-by-wire variables,
the target curve differing in shape from the reference
curve within the near limit handling range.

18. The system according to claim 17, wherein:
the target curve is configured with a smoother gradient
than the reference curve within the near limit handling
range and with a similar gradient to the reference curve
within the non-near limit handling range.

19. A vehicle, comprising:
a plurality of wheels operable to facilitate movement of
the vehicle;
a powertrain operable to rotate one or more of the wheels
in response to mechanical power generated with an
internal combustion engine and/or an electric motor;
a steer-by-wire system configured for steering one or
more of the wheels, the steer-by-wire system config-
ured for:
determining an observed responsive rack force based
on a responsive rack force measurement taken with
a responsive rack force observer of the steer-by-wire
system;
estimating a reference responsive rack force based on a
reference model of the steer-by-wire system;
estimating a target responsive rack force based on a
target model of the steer-by-wire system;
determining a corrected responsive rack force accord-
ing to a rack equation, the rack equation being
defined as:

$$CRF=max((RRF-TRF)+ORF),MSV)$$

wherein CRF equals the corrected responsive rack
force, RRF equals the reference responsive rack
force, TRF equals the target responsive rack force,
ORF equals the observed responsive rack force, and
MSV equals a minimum saturation value for the
steer-by-wire system; and
determining a driver feedback torque based on the
corrected responsive rack force.

20. The vehicle according to claim 19, wherein:
the reference model is configured for estimating the
reference responsive rack force based on a reference
curve defined relative to current suspension and steer-
ing kinematics for the steer-by-wire system and one or
more steer-by-wire operating variables; and
the target model is configured for estimating the target
responsive rack force based on a target curve defined
relative to targeted suspension and steering kinematics for the steer-by-wire system and one or more of the steer-by-wire operating variables, the target curve having a smoother gradient than the reference curve within a near limit handling range of the steer by wire system, the near limit handling range corresponding with a predefined operating range occurring prior to reaching a limit of adhesion of the wheels.

* * * * *